(12) United States Patent
Nicholes

(10) Patent No.: US 9,081,698 B2
(45) Date of Patent: *Jul. 14, 2015

(54) MEMORY WITH SELECTIVELY WRITABLE ERROR CORRECTION CODES AND VALIDITY BITS

(71) Applicant: Medtronic, Inc., Minneapolis, MN (US)

(72) Inventor: James W. Nicholes, Gilbert, AZ (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,077

(22) Filed: Sep. 24, 2013

(65) Prior Publication Data

US 2014/0026016 A1  Jan. 23, 2014

Related U.S. Application Data

(62) Division of application No. 12/967,642, filed on Dec. 14, 2010, now Pat. No. 8,560,892.

(51) Int. Cl.
*G06F 11/00* (2006.01)
*G06F 11/10* (2006.01)

(52) U.S. Cl.
CPC ............ *G06F 11/10* (2013.01); *G06F 11/1048* (2013.01)

(58) Field of Classification Search
CPC .............................. G06F 11/10; G06F 11/1048
See application file for complete search history.

(56) References Cited

U.S. PATENT DOCUMENTS

| 8,239,732 | B2 | 8/2012 | Tan et al. |
| 2005/0268208 | A1 | 12/2005 | Shimizume et al. |
| 2007/0113155 | A1 | 5/2007 | Takahashi |
| 2007/0220354 | A1 | 9/2007 | Moyer |
| 2009/0156908 | A1 | 6/2009 | Belalcazar et al. |
| 2011/0138252 | A1* | 6/2011 | Pawlowski et al. ........... 714/763 |

OTHER PUBLICATIONS (PCT/US2011/063499) PCT Notification of Transmittal of the International Search Report and the Written Opinion of the International Searching Authority, Mailed Jun. 12, 2012, 13 pages.

* cited by examiner

*Primary Examiner* — Michael Maskulinski
(74) *Attorney, Agent, or Firm* — Evans M. Mburu

(57) ABSTRACT

Memory and method for storing a plurality of memory bits. The memory has a data storage element and a processor. The data storage element has a plurality of lines, each having a plurality of segments having a plurality of data bits. A plurality of error correction codes are each associated with one of the lines. A plurality of validity bits, each being associated with one of the lines, are configured to indicate that one of the error correction codes associated with the one of the lines is valid or invalid. The processor is configured to generate one of the error correction codes for all of the data bits in the segments associated with one of the lines.

9 Claims, 6 Drawing Sheets

US 9,081,698 B2

MEMORY WITH SELECTIVELY WRITABLE ERROR CORRECTION CODES AND VALIDITY BITS

FIELD

Figure 1:
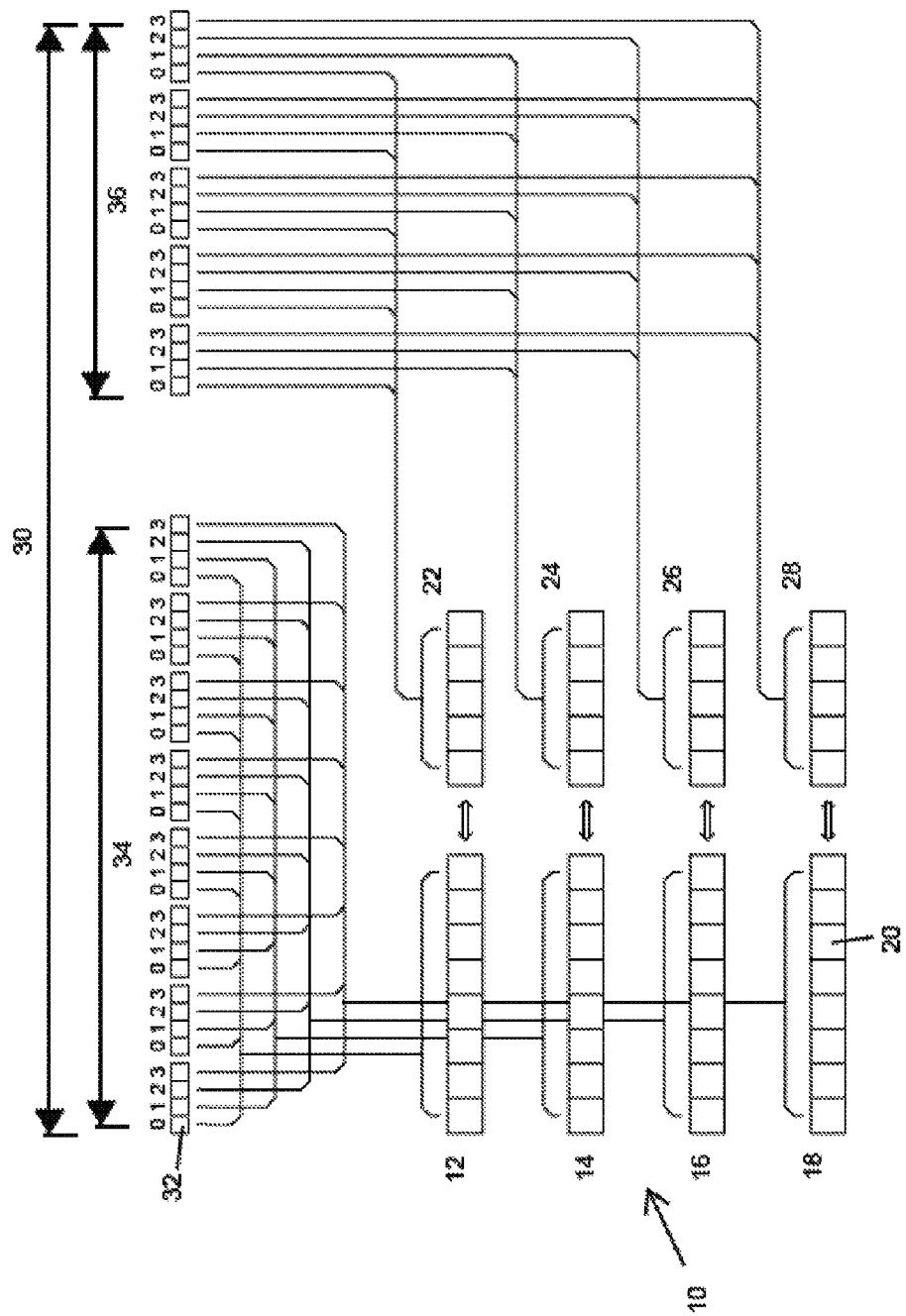

The present invention relates generally to readable and writable memories and, in particular, to such readable and writable memories utilizing error correction codes.

BACKGROUND

Electrically active implantable medical devices such as pacemakers, cardioverter/defibrillators, neurological stimulators and drug pumps are well known in the art. Such implantable medical devices are commonly powered by an internal power source, such as a battery, and are controlled by an internal controller, such as a microprocessor. The controller commonly controls additional circuitry to deliver appropriate therapy to the patient in whom the device has been implanted and to sense the patient condition using internal sensors. Further, the controller commonly controls a wireless communication system which enables the implantable medical device to exchange information and commands with medical devices external to the patient, as well as other implantable medical devices.

In order to facilitate the various functions of the controller of the implantable medical device, such implantable medical devices are commonly provided with readable and rewriteable data storage elements. Such data storage elements may be utilized by the controller to perform operations, may store sensor information from the implantable medical devices and may store information to be sent or which has been received via wireless communications, among other digital information which may be associated with the implantable medical device, as is well known in the art. Such data storage elements may include conventional random access memory (RAM) blocks, such as static random access memory (SRAM), as well as memory devices considered to be non-volatile, such as electrically erasable programmable read-only memory (EEPROM).

Such data storage elements commonly and conventionally incorporate error checking and correction systems. Methods well known in the art, such as parity bits, checksums and error correction codes, provide, to varying degrees, the ability to identify digital information which has become corrupted and, in some cases, correct the corrupted information. In particular, such methods commonly incorporate dedicated error checking memory cells which correspond to particular, predetermined data memory cells. As known in the art, when a byte of data is to be stored in data memory cells, an error correction code is calculated for the byte and the error checking memory cells are programmed with the code based concurrent with the storing of the data.

If a memory cell of either the error checking memory cells or the data memory cells changes, because of spontaneous data corruption, physical corruption of the memory cell, or because of various alternative causes, the code in the error checking cells will not correspond to the data in the data memory cells and it may be inferred that at least one memory cell has become corrupted. In methods which also provide for error correction, it may be possible to restore the corrupted memory cell to its appropriate configuration. Error correction methods may be particularly beneficial in medical device applications where corrupted data may impact the performance of the implantable device or deny a medical professional stored data which may be useful in diagnosing the patient's condition.

SUMMARY

However, because the implantable medical device is located within the patient, and not easily physically accessible, activities which consume electrical power, and thus which drain the battery, may reduce the useful life of the implantable medical device. Because various data storage elements, such as RAM, utilize power resources in order to maintain the data stored within the element, every memory cell actively being utilized creates some drain on the battery resources. Because error correction codes usually require dedicated memory cells, then, the use of error correction codes may create an additional drain on the battery, potentially shortening the useable life of the implantable medical device.

Moreover, conventional error correction code schemes conventionally form lines of memory cells having a set number of bytes of data cells and four error correction code bits for each byte of data cells and, in certain embodiments, a bit for noting and maintaining the validity status of the line, such as a checksum or odd/even bit. Such conventional error correction code schemes require a sixty-three percent (63%) increase in memory size, and thus memory power, over a data storage element with a similar data capacity but without error correction. In embodiments of data memory which have a power source of a wall outlet or some other easily replenishable power source, the added power consumption may be a relatively modest and a worthwhile expense in order to provide memory lines with one byte of data storage.

In order to conserve power in a data storage element to be utilized in circumstances where power resources are not abundant, a data storage element has been developed which provides error correction capabilities while utilizing fewer memory resources, and thus less power, in comparison with convention error correction methods. Each line, containing multiple data bytes, in the data storage element incorporates a single error correction code for all of multiple bytes of that line. By providing an error correction code for the entire line, error correction bits may be reduced as a proportion of the total size of the element.

However, because memory cells are conventionally written according to bytes, and each line in the data storage element incorporates a single error correction code for multiple bytes, the error correction code for the line may be not be calculated as part of the act of writing a single byte to memory. Rather, to produce the error correction code, all of the data in the line must be read and an error correction code produced having available all of the data for the line, including the multiple data bytes. Particularly during operations involving writing large amounts of data, system resources may not be readily available to read all of the data of a memory line as part of the writing of a single byte to the line, then calculate the new error correction code and then rewrite the error correction code and the new data byte to the memory line.

This is especially true since some write operations are sequential, i.e., multiple bytes are written to memory in sequence perhaps writing first one byte in a single line and then writing a second byte for that same line. If the error code were written upon the storage of each byte, that particular line would be read in its entirety twice in quick succession in order to first produce an error correction code the entire line after the writing of the first byte and again to produce an error correction code after writing of the second byte. With the likelihood of a data bit error in such a short period of time, system resources are mostly wasted as error correction codes are repeated prepared each time one byte in a line is written.

As a result, in order to conserve system resources, when a data byte is written to a line, a validity or "scrub" bit corresponding to the validity of the error correction code for the line is set to indicate that the error correction code is invalid. Then, at a later time, when system resources are available, the data from the entire line is read, an error correction code is calculated and written to the line and the validity bit is set to indicate that the error correction code is valid. In this way, an error correction code for multiple bytes may be obtained while preserving system resources and keeping track of the status of the error correction code's validity.

In an embodiment, a readable and writable memory is configured to store a plurality of memory bits and has a data storage element and a processor. The data storage element has a plurality of lines, each of the plurality of lines having a plurality of segments, each of the plurality of segments having a plurality of data bits, a plurality of error correction codes each associated with one of the plurality of lines, and a plurality of validity bits, each one of the plurality of validity bits being associated with one of the plurality of lines, configured to indicate that one of the plurality of error correction codes associated with the one of the plurality of lines is valid or invalid. The processor is configured to generate one of the plurality of error correction codes for all of the plurality of data bits in the plurality of segments associated with one of the plurality of lines. The plurality of data bits associated with one of the plurality of segments of one of the plurality of lines are separately storable without affecting a remainder of the plurality of data bits associated with others of the plurality of segments associated with the one of the plurality of lines.

In an embodiment, all of the plurality of data bits associated with one of the plurality of lines being activated when any of the plurality of data bits associated with one of the plurality of segments is read.

In an embodiment, the processor is configured to mark one of the plurality validity bits associated with the one of the plurality of lines to indicate that the one of the plurality of error correction codes associated with the one of the plurality of lines as being invalid prior to the processor generating the one of the plurality of error correction codes for the one of the plurality of lines.

In an embodiment, the processor is configured to periodically repeat the generation of the one of the plurality of error codes and the marking of the one of the plurality of validity bits.

In an embodiment, the interval is selected based, at least in part, on a likelihood of individual ones of the data bits to be corrupt over the interval due to an external event.

In an embodiment, a corruption of an individual one of the data bits does not prevent the individual one of the data bits from storing new data.

In an embodiment, the processor is configured, after the marking, to, compare one of the plurality of error correction codes with the plurality of data bits stored in the corresponding one of the plurality of lines to generate a comparison and determine if any of the data bits of the one of the plurality of lines is in error based upon the comparison and correct the any of the plurality of data bits stored in the one of the plurality of lines based, at least in part, on the one of the plurality of error correction codes.

In an embodiment, the memory further has a receiver operatively coupled to the data storage elements and the processor, the receiver configured to receive the plurality of data bits and a transmission error correction code. The processor is configured to verify an accuracy of the plurality of data bits based on the transmission error correction code and if the accuracy is indicative of an error in one of the plurality of data bits, correct the one of the plurality of data bits by writing the one of the plurality of data bits back to a corresponding one of the plurality of memory bits.

In an embodiment, the memory further has a transmitter operatively coupled to the data storage element and the processor, the transmitter configured to transmit the plurality of data bits and the error correction code to a receiver separate from the memory.

In an embodiment, the memory further has a transmitter operatively coupled to the data storage element and the processor, the processor further configured to generate a transmission error correction code based, at least in part, on the plurality of data bits using the processor, the transmitter configured to transmit the plurality of data bits and the transmission error code to a receiver separate from the memory.

In an embodiment, a method of storing data in a memory is disclosed, the memory having a data storage element having a plurality of lines, each of the plurality of lines having a plurality of segments, each of the plurality of segments having a plurality of data bits, a plurality of error correction codes each associated with the plurality of segments associated with each one of the plurality of lines, and a plurality of validity bits each associated with one of the plurality of lines. A plurality of data bits are stored into one of the plurality of segments of one of the plurality of lines without modifying any of the plurality of data bits associated with other of the plurality of segments associated with the one of the plurality of lines. Then one of the plurality of error correction codes is generated for all of the plurality of data bits in the plurality of segments associated with the one of the plurality of lines. Then one of the plurality validity bits associated with the one of the plurality of lines is marked to indicate one of the plurality of error correction codes associated with the one of the plurality of lines as being valid.

FIGURES

Figure 2:
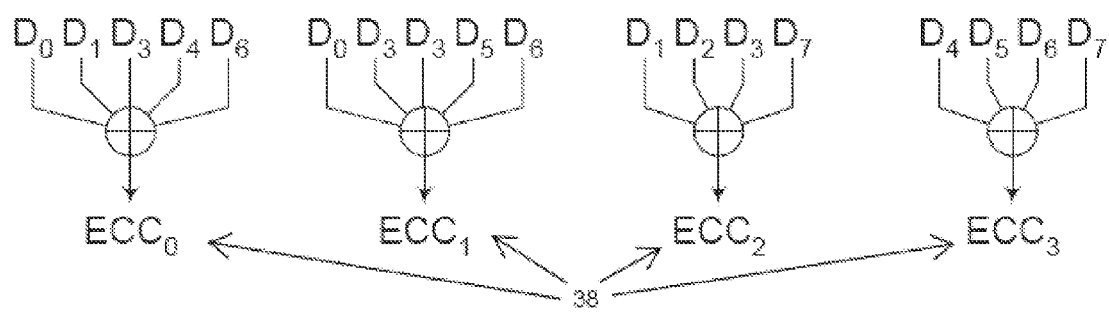
Figure 3:
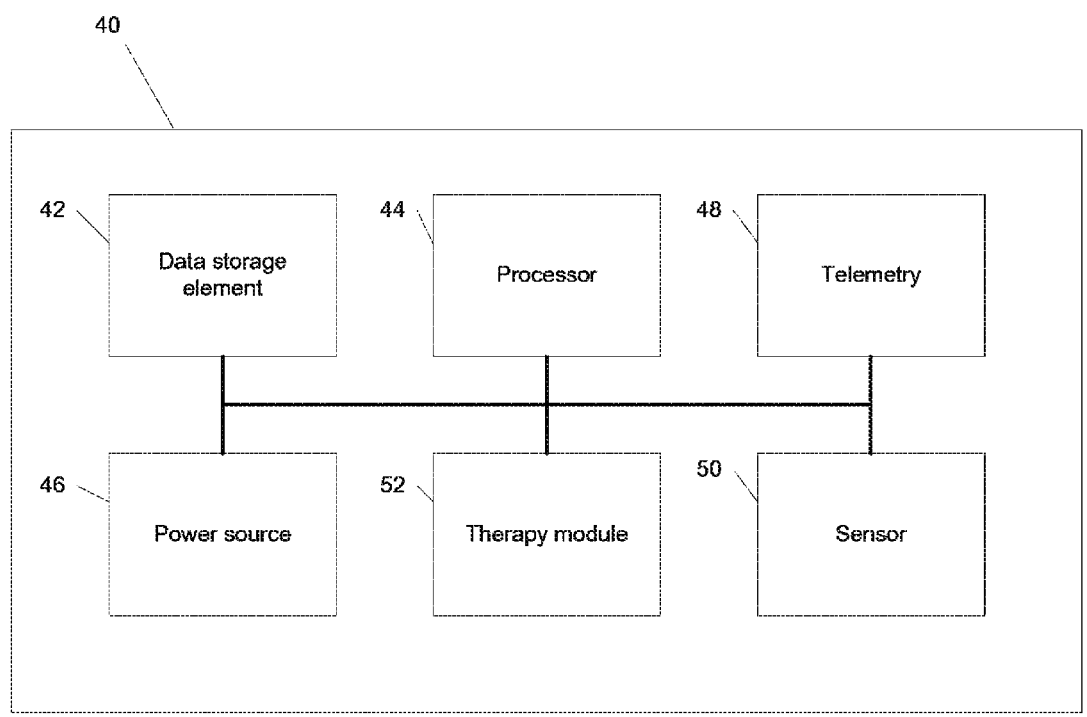
Figure 4:
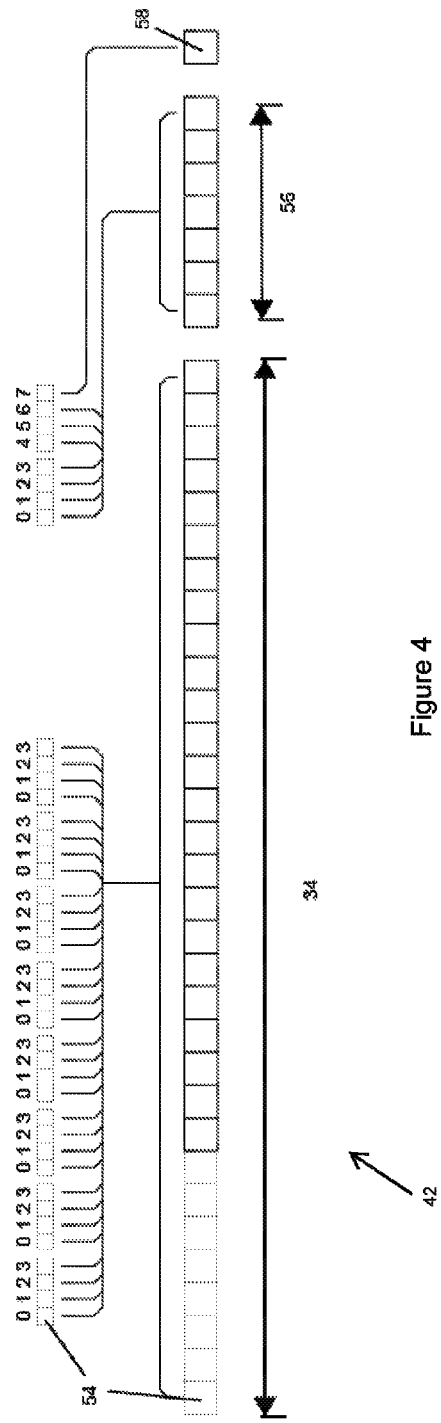
Figure 5:
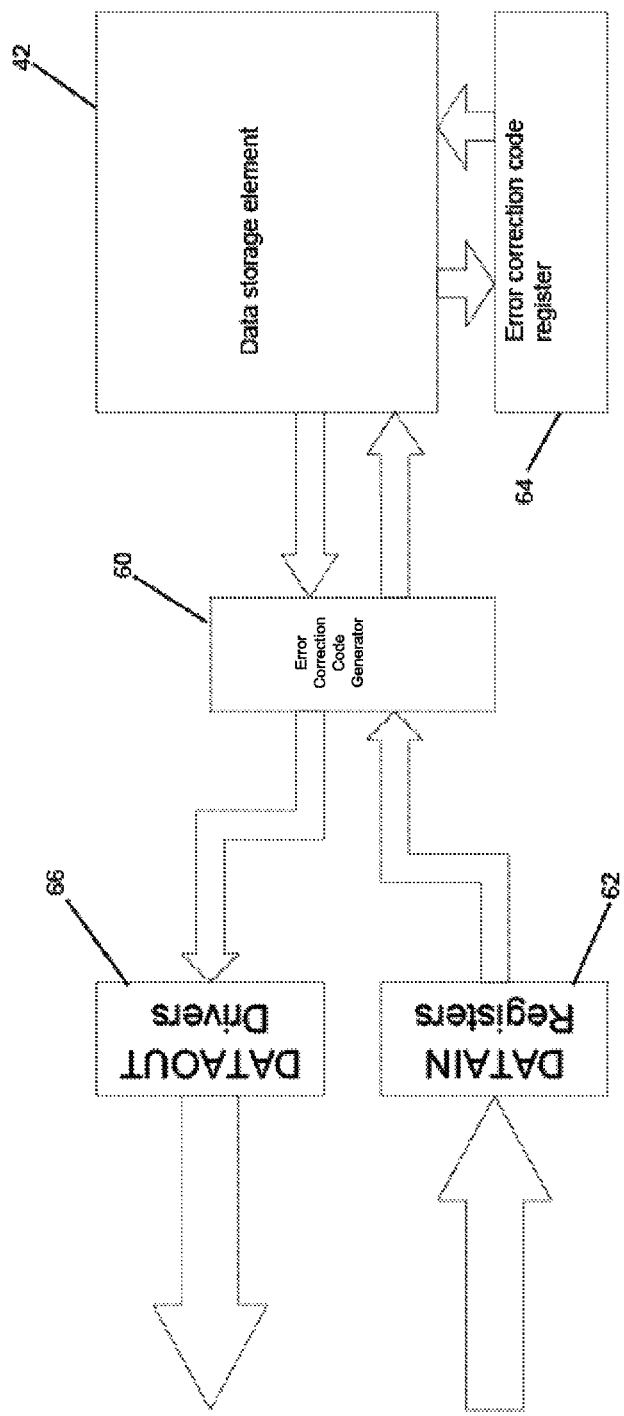
Figure 6:
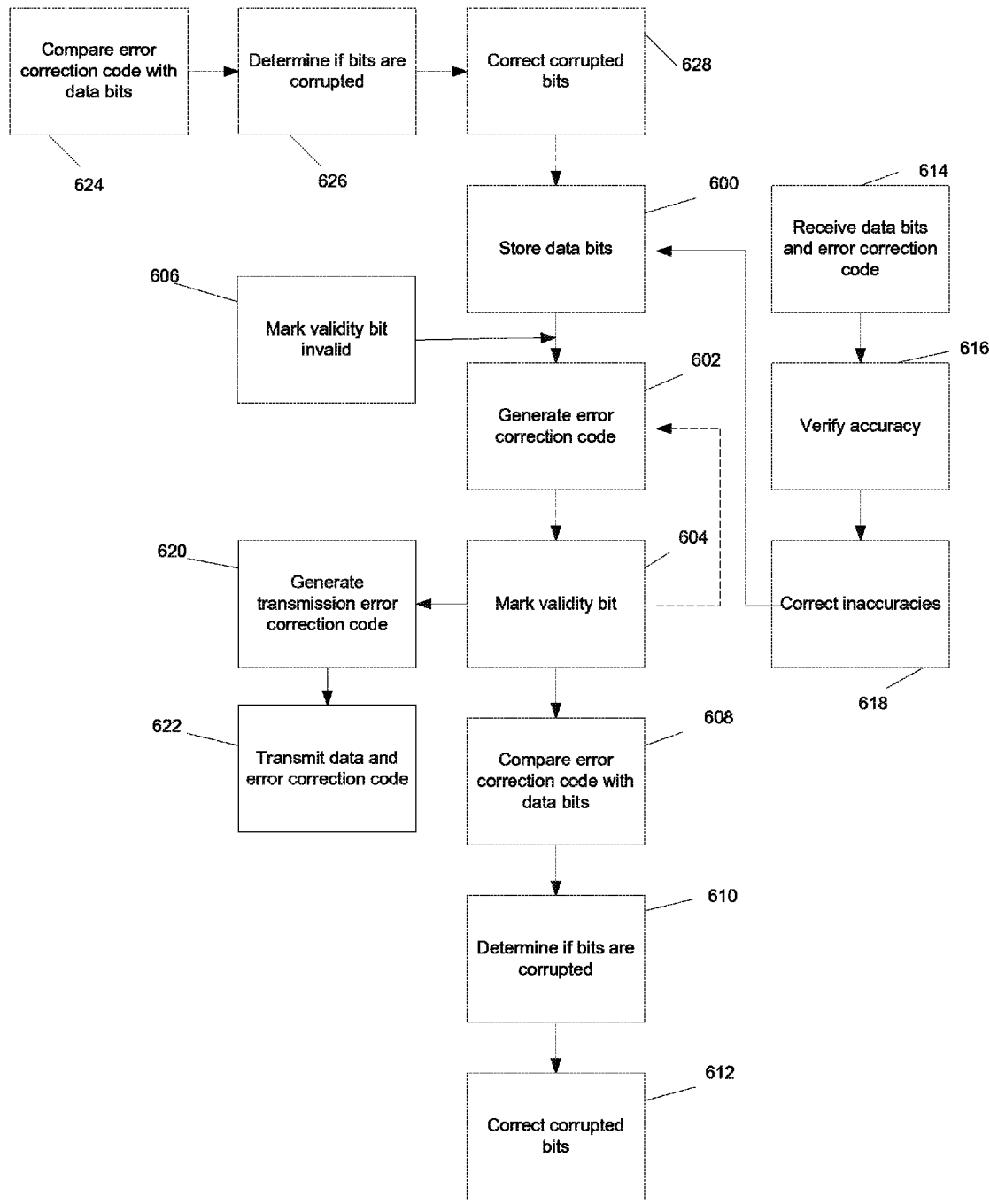

FIG. 1 is a portion of a data storage element of the prior art;
FIG. 2 is an error correction code generation scheme;
FIG. 3 is a block diagram implantable medical device;
FIG. 4 is a portion of a data storage element for use in the implantable medical device of FIG. 3;
FIG. 5 is a block diagram of a data reception and transmission system incorporating the data storage element of FIG. 4; and
FIG. 6 is a flowchart for storing data in a data storage element.

DESCRIPTION

FIG. 1 illustrates a portion of a prior art data storage element 10 incorporating a relatively large number of data bytes organized into a plurality of lines. Four data segments, bytes or words (as illustrated) 12, 14, 16, 18 of data storage element 10 are each comprised of eight data bits 20 and are each associated with a dedicated error correction code block 22, 24, 26, 28 of five bits. Memory cells 30 of data storage element 10 are organized into line 32, with each zero bit of each byte 12, 14, 16, 18 written in data memory cells 34 of memory cells 30, followed by each one bit of each byte, and so forth. To provide simplicity in powering thousands, millions or potentially vastly more of memory cells 30 in a single data storage element, each memory cell 30 of line 32 is electrically coupled to a common power source, thereby either powering all memory cells 30 of line 32 at once or powering off all memory cells 30 of line 32 at once. Line 32 then incorporates error correction memory cells 36, with each zero bit of each memory error correction code block 22, 24, 26, 28 stored first, followed by each one bit and so forth.

An error correction code 22, 24, 28 may be calculated according to an exemplary known algorithm, which dictates that n+1 error correction bits are needed for single error detection and correction for each $2^n$ data bits, plus one additional bit for dual error detection without correction. FIG. 2 illustrates the mathematical process by which each error correction code bit is determined for one byte. Various predetermined data bits $D_x$ 20 of one of data bytes 12, 14, 16, 18 are combined with the logical XOR operator to produce error correction bits $ECC_0$, $ECC_1$, $ECC_2$ and $ECC_3$ 38. In order to verify the validity of the data of corresponding data byte, the data byte may again be subjected to the error correction code mathematical process to obtain new error correction code bits 38 which may then be compared against the prior error correction code bits 38. In addition to identifying whether the associated data byte has been corrupted, the comparison will also show which particular bit of the data byte has been corrupted. It is to be recognized and understood that other well known techniques for calculating error correction codes, as well as techniques yet to be developed, may be utilized.

In the following exemplary embodiment, eight data bits plus four parity bits are provided for the sake of simplicity of example. Thus, a total of twelve bits are utilized for the storage of one byte with error correction.

TABLE 1

| word bits | W12 | W11 | W10 | W9 | W8 | W7 | W6 | W5 | W4 | W3 | W2 | W1 |
|---|---|---|---|---|---|---|---|---|---|---|---|---|
| data bits | D8 | D7 | D6 | D5 |    | D4 | D3 | D2 |    | D1 |    |    |
| parity bits |   |    |    |    | P4 |    |    |    | P3 |    | P2 | P1 |
| word bits | 1 | 1 | 0 | 0 | x | 1 | 0 | 1 | x | 0 | x | x |

As shown in Table 1, the least significant bit ("LSB") of the data is in word position 3, or in binary, 0011. The most significant bit ("MSB") of data is in word position 12, or binary 1100. Wherever a data bit is a "1", the corresponding binary counts are used to generate the parity bits. Since $D_8/W_{12}$ is a "1", the binary value of 12 is included in the parity generation, but since $D_1/W_3$ is a "0", the binary value of 3 is not included. As shown in Table 2 below, in this example, four data bits are "1", and their four corresponding binary values of their word positions are used to generate parity.

TABLE 2

| D2 | word bit 5  | 0 | 1 | 0 | 1 |
|----|-------------|---|---|---|---|
| D4 | word bit 7  | 0 | 1 | 1 | 1 |
| D7 | word bit 11 | 1 | 0 | 1 | 1 |
| D8 | word bit 12 | 1 | 1 | 0 | 0 |

As shown in Table 3, parity is generated by performing an EVEN parity generation on each column of "1's" and "0's" as shown below.

TABLE 3

| D2 | word bit 5  |    |    |    |    | 0 | 1 | 0 | 1 |
|----|-------------|----|----|----|----|---|---|---|---|
| D4 | word bit 7  |    |    |    |    | 0 | 1 | 1 | 1 |
| D7 | word bit 11 |    |    |    |    | 1 | 0 | 1 | 1 |
| D8 | word bit 12 |    |    |    |    | 1 | 1 | 0 | 0 |
|    |             | P4 | P3 | P2 | P1 |   |   |   |   |
|    |             | 0  | 1  | 0  | 1  |   |   |   |   |

The four parity bits are placed into their respective positions in the data word, which is then transmitted or stored, for example.

TABLE 4

| word bits | W12 | W11 | W10 | W9 | W8 | W7 | W6 | W5 | W4 | W3 | W2 | W1 |
|---|---|---|---|---|---|---|---|---|---|---|---|---|
|  | D8 | D7 | D6 | D5 | P4 | D4 | D3 | D2 | P3 | D1 | P2 | P1 |
|  | 1 | 1 | 0 | 0 | 0 | 1 | 0 | 1 | 1 | 0 | 0 | 1 |

In an example for illustrative purposes, a receive or read operation takes place during which one of the data bits is corrupted. In this example, let us assume that it is data bit 5, which is at word position 9. The same even parity generation table is constructed, however, since D5 is now a "1" its corresponding binary word value of 9 (or 1001) is added to the table. Since these parity bits are being created after data has been received, they are called the verify parity bits and are designated Vn.

TABLE 5

| word bits with W9 corruption | W12 D8 1 | W11 D7 1 | W10 D6 0 | W9 D5 1 | W8 P4 0 | W7 D4 1 | W6 D3 0 | W5 D2 1 | W4 P3 1 | W3 D1 0 | W2 P2 0 | W1 P1 1 |
|---|---|---|---|---|---|---|---|---|---|---|---|---|
| | | D2 | | word bit 5 | | 0 | 1 | 0 | 1 | | | |
| | | D4 | | word bit 7 | | 0 | 1 | 1 | 1 | | | |
| | | D5 | | word bit 9 | | 1 | 0 | 0 | 1 | | | |
| | | D7 | | word bit 11 | | 1 | 0 | 1 | 1 | | | |
| | | D8 | | word bit 12 | | 1 | 1 | 0 | 0 | | | |
| | | | | | V4 1 | V3 1 | V2 0 | V1 0 | | | | |

As shown in Table 5, the parity bits from the received word are extracted and exclusive OR'ed, bit per bit, with the verify bits. If there were no bit transmission errors, the parity and verify words will be identical and the exclusive OR operation, which creates the correction word, will be zero. If the exclusive OR correction word is not zero, then an error has taken place.

TABLE 6

| P4 | P3 | P2 | P1 | 0 | 1 | 0 | 1 |
|---|---|---|---|---|---|---|---|
| V4 | V3 | V2 | V1 | 1 | 1 | 0 | 0 |
| C4 | C3 | C2 | C1 | 1 | 0 | 0 | 1 |

As shown in Table 6, in this example, the correction word is binary 1001, which is the decimal value of 9. It was word bit $W_9$ that was corrupted. Regardless of whether the data corruption was a "1" to a "0" or a "0" to a "1", the correction is to simply flip the logic state of the word bit indicated by the result of the exclusive OR operation of the parity word and verify word.

The example continues where parity bit $P_3$ is in error, as in Table 7. The data bits will be used to construct a verify word as normal.

TABLE 7

| word bits with W9 corruption | W12 D8 1 | W11 D7 1 | W10 D6 0 | W9 D5 0 | W8 P4 0 | W7 D4 1 | W6 D3 0 | W5 D2 1 | W4 P3 0 | W3 D1 0 | W2 P2 0 | W1 P1 1 |
|---|---|---|---|---|---|---|---|---|---|---|---|---|
| | | D2 | | word bit 5 | | 0 | 1 | 0 | 1 | | | |
| | | D4 | | word bit 7 | | 0 | 1 | 1 | 1 | | | |
| | | D7 | | word bit 11 | | 1 | 0 | 1 | 1 | | | |
| | | D8 | | word bit 12 | | 1 | 1 | 0 | 0 | | | |
| | | | | | V4 0 | V3 1 | V2 0 | V1 1 | | | | |

Since all of the data bits are correct, the verify word is the correct original parity word. When it is exclusive OR'ed with the parity bits from the received data, $P_3$ of which is in error, the result is as follows in Table 8.

TABLE 8

| P4 | P3 | P2 | P1 | 0 | 0 | 0 | 1 |
|---|---|---|---|---|---|---|---|
| V4 | V3 | V2 | V1 | 0 | 1 | 0 | 1 |
| C4 | C3 | C2 | C1 | 0 | 1 | 0 | 0 |

The exclusive OR correction word is binary 0100, which is decimal value 4. The had parity bit $P_3$ resides at word bit position 4.

In an example, two bits may become corrupted. This form of ECC can detect and correct a single corrupted bit of a transmitted word, whether it is a data bit or parity bit. By adding just one extra bit of information to the transmitted word, detection of two bits of corruption can be accomplished, however, the two bits of error cannot be corrected. More than just one bit of additional information would be needed for dual bit correction. Table 9 presents a new example.

TABLE 9

| word bits | W12 D8 0 | W11 D7 1 | W10 D6 1 | W9 D5 1 | W8 P4 1 | W7 D4 0 | W6 D3 0 | W5 D2 1 | W4 P3 1 | W3 D1 1 | W2 P2 1 | W1 P1 0 | W0 P0 0 |
|---|---|---|---|---|---|---|---|---|---|---|---|---|---|

Data for this word is 01110011. The generated parity is 1110. Added onto this word is a 13th bit, or a 5th parity bit at location $W_0$. The purpose of the fifth parity bit is to set the entire word, data bits and parity bits to even parity. Since there are eight "1's" in the word, $P_0/W_0$ is a "0". Now, if one bit is corrupted in the data transmission, if it was a "1" bit corrupted to a "0", then there will be an odd number of "1's" in the entire word ($W_{12}$-$W_0$). Since the entire word was supposed to be even parity, an error occurred. If the corruption was a "0" becoming a "1", again, there will be an odd number of "1's" in the entire word; again an indication of a data error. At this point, the bit in error is unknown. It could have been a data bit, it could have been one of the four ECC parity bits, or it could have been parity bit $P_0$.

If two bits of data are corrupted, whether they are both data bits, both ECC parity bits, or one of each, when a parity check of bits $W_{12}$-$W_0$ is made, it will always show even parity. Going back to the previous example, there is an even number of "1" bits. If bits $W_{12}$ and $W_{11}$ are corrupted, a "0" becoming a "1" and a "1" becoming a "0", there will still be an even number of "1's". Even parity is maintained. If bits $W_7$ and $W_6$ are corrupted, two "0's" becoming two "1's", again, there will still be an even number of "1's". If $W_4$ and $W_2$ become corrupted, two "1's" becoming two "0's", once again, there are still an even number of "1's"—even parity is always maintained when there are two bits of error. The key in a dual error detection scenario is to verify that there is still even parity of the entire data word, while examining the correction word which is generated from the parity bits and the verify bits.

Table 10 depicts a received word.

TABLE 10

| word bits | W12 | W11 | W10 | W9 | W8 | W7 | W6 | W5 | W4 | W3 | W2 | W1 | W0 |
|---|---|---|---|---|---|---|---|---|---|---|---|---|---|
| | D8 | D7 | D6 | D5 | P4 | D4 | D3 | D2 | P3 | D1 | P2 | P1 | P0 |
| | 0 | 1 | 1 | 1 | 1 | 1 | 1 | 1 | 1 | 1 | 1 | 0 | 0 |

Generation of the verify word is shown in Table 11.

TABLE 11

| D1 | word bit 3 | 0 | 0 | 1 | 1 |
| D2 | word bit 5 | 0 | 1 | 0 | 1 |
| D3 | word bit 6 | 0 | 1 | 1 | 0 |
| D4 | word bit 7 | 0 | 1 | 1 | 1 |
| D5 | word bit 9 | 1 | 0 | 0 | 1 |
| D6 | word bit 10 | 1 | 0 | 1 | 0 |

TABLE 11-continued

| D7 | word bit 11 | 1 | 0 | 1 | 1 |
| | V4 V3 V2 V1 | | | | |
| | | 1 | 1 | 1 | 1 |

Generation of the correction word is shown in Table 12.

TABLE 12

| P4 P3 P2 P1 | 1 | 1 | 1 | 0 |
| V4 V3 V2 V1 | 1 | 1 | 1 | 1 |
| C4 C3 C2 C1 | 0 | 0 | 0 | 1 |

The address of the correction word is wrong. Word bit 1 is an ECC parity bit which was not corrupted. To prevent the ECC correction logic from flipping bit 1 from a "0" to a "1", and then misleading the user into thinking that the data has been corrected, the parity of the entire word is examined. If the word parity is still even, and the correction word is not all "0's", then a dual bit error has taken place. However, the location of the two erroneous bits remains unknown.

Eight examples of error detection are provided below. In these examples, the incorrect bits are signified in bold font. Also, one more bit of information is added. It is a single even parity bit generated from the full received word. If the full word parity is even, that bit will be a "0". If the parity is odd, that bit will be a "1". It will be called the check hit, or CKB. It is not part of the transmitted data.

Table 13 depicts an example with no errors.

TABLE 13

| original data | W12 D8 1 | W11 D7 1 | W10 D6 0 | W9 D5 1 | W8 P4 1 | W7 D4 0 | W6 D3 0 | W5 D2 0 | W4 P3 1 | W3 D1 1 | W2 P2 0 | W1 P1 1 | W0 P0 1 | |
| received data | W12 D8 1 | W11 D7 1 | W10 D6 0 | W9 D5 1 | W8 P4 1 | W7 D4 0 | W6 D3 0 | W5 D2 0 | W4 P3 1 | W3 D1 1 | W2 P2 0 | W1 P1 1 | W0 P0 1 | CKB 0 |
| | | | D1 | | word bit 3 | | | 0 | 0 | 1 | 1 | | | |
| | | | D5 | | word bit 9 | | | 1 | 0 | 0 | 1 | | | |
| | | | D7 | | word bit 11 | | | 1 | 0 | 1 | 1 | | | |
| | | | D8 | | word bit 12 | | | 1 | 1 | 0 | 0 | | | |
| | | | | | | | | V4 1 | V3 1 | V2 0 | V1 1 | | | |
| | | | | | P4 P3 P2 P1 | | | 1 | 1 | 0 | 1 | | | |
| | | | | | V4 V3 V2 V1 | | | 1 | 1 | 0 | 1 | | | |
| | | | | | C4 C3 C2 C1 | | | 0 | 0 | 0 | 0 | | | |

As shown, check bit ("CBK") equals 0, designating no error or a dual hit error. Correction word is equal to 0000, indicating that no hit needs correction. Both these conditions taken together indicate no error.

In an example, shown in Table 14, single data bit error with correction is illustrated.

TABLE 14

| original | W12 | W11 | W10 | W9 | W8 | W7 | W6 | W5 | W4 | W3 | W2 | W1 | W0 | |
|---|---|---|---|---|---|---|---|---|---|---|---|---|---|---|
| data | D8 | D7 | D6 | D5 | P4 | D4 | D3 | D2 | P3 | D1 | P2 | P1 | P0 | |
|  | 1 | 1 | 1 | 1 | 0 | 0 | 0 | 0 | 1 | 0 | 0 | 0 | 1 | |
| received | W12 | W11 | W10 | W9 | W8 | W7 | W6 | W5 | W4 | W3 | W2 | W1 | W0 | |
| data | D8 | D7 | D6 | D5 | P4 | D4 | D3 | D2 | P3 | D1 | P2 | P1 | P0 | CKB |
|  | 1 | 0 | 1 | 1 | 0 | 0 | 0 | 0 | 1 | 0 | 0 | 0 | 1 | 1 |
|  |  |  | D5 |  | Word bit 9 |  |  | 1 | 0 | 0 | 1 |  |  |  |
|  |  |  | D6 |  | word bit 10 |  |  | 1 | 0 | 1 | 0 |  |  |  |
|  |  |  | D8 |  | word bit 12 |  |  | 1 | 1 | 0 | 0 |  |  |  |
|  |  |  |  |  |  |  |  | V4 | V3 | V2 | V1 |  |  |  |
|  |  |  |  |  |  |  |  | 1 | 1 | 1 | 1 |  |  |  |
|  |  |  |  | P4 | P3 | P2 | P1 | 0 | 1 | 0 | 0 |  |  |  |
|  |  |  |  | V4 | V3 | V2 | V1 | 1 | 1 | 1 | 1 |  |  |  |
|  |  |  |  | C4 | C3 | C2 | C1 | 1 | 0 | 1 | 1 |  |  |  |

As shown, check bit CKB equals 1, designating single bit error. Correction word=1011=11 which is the erroneous $W_{11}/D_7$.

In an example, illustrated in Table 15, single ECC parity bit error is illustrated.

TABLE 15

| original | W12 | W11 | W10 | W9 | W8 | W7 | W6 | W5 | W4 | W3 | W2 | W1 | W0 | |
|---|---|---|---|---|---|---|---|---|---|---|---|---|---|---|
| data | D8 | D7 | D6 | D5 | P4 | D4 | D3 | D2 | P3 | D1 | P2 | P1 | P0 | |
|  | 0 | 0 | 1 | 1 | 0 | 0 | 0 | 0 | 0 | 1 | 0 | 0 | 1 | |
| received | W12 | W11 | W10 | W9 | W8 | W7 | W6 | W5 | W4 | W3 | W2 | W1 | W0 | |
| data | D8 | D7 | D6 | D5 | P4 | D4 | D3 | D2 | P3 | D1 | P2 | P1 | P0 | CKB |
|  | 0 | 0 | 1 | 1 | 0 | 0 | 0 | 0 | 1 | 1 | 0 | 0 | 1 | 1 |
|  |  |  | D1 |  | word bit 3 |  |  | 0 | 0 | 1 | 1 |  |  |  |
|  |  |  | D5 |  | word bit 9 |  |  | 1 | 0 | 0 | 1 |  |  |  |
|  |  |  | D6 |  | word bit 10 |  |  | 1 | 0 | 1 | 0 |  |  |  |
|  |  |  |  |  |  |  |  | V4 | V3 | V2 | V1 |  |  |  |
|  |  |  |  |  |  |  |  | 0 | 0 | 0 | 0 |  |  |  |
|  |  |  |  | P4 | P3 | P2 | P1 | 0 | 1 | 0 | 0 |  |  |  |
|  |  |  |  | V4 | V3 | V2 | V1 | 0 | 0 | 0 | 1 |  |  |  |
|  |  |  |  | C4 | C3 | C2 | C1 | 0 | 1 | 0 | 0 |  |  |  |

As shown, cheek bit CKB equals 1, designating single bit error. Correction word=0100=4 Which is the erroneous bit $W_4/P_3$.

In an example, illustrated in Table 16, single bit error of word parity bit is illustrated.

TABLE 16

| original | W12 | W11 | W10 | W9 | W8 | W7 | W6 | W5 | W4 | W3 | W2 | W1 | W0 | |
|---|---|---|---|---|---|---|---|---|---|---|---|---|---|---|
| data | D8 | D7 | D6 | D5 | P4 | D4 | D3 | D2 | P3 | D1 | P2 | P1 | P0 | |
|  | 1 | 1 | 0 | 1 | 1 | 0 | 0 | 0 | 1 | 0 | 1 | 0 | 0 | |
| received | W12 | W11 | W10 | W9 | W8 | W7 | W6 | W5 | W4 | W3 | W2 | W1 | W0 | |
| data | D8 | D7 | D6 | D5 | P4 | D4 | D3 | D2 | P3 | D1 | P2 | P1 | P0 | CKB |
|  | 1 | 1 | 0 | 1 | 1 | 0 | 0 | 0 | 1 | 0 | 1 | 0 | 1 | 1 |
|  |  |  | D5 |  | word bit 9 |  |  | 1 | 0 | 0 | 1 |  |  |  |
|  |  |  | D7 |  | word bit 11 |  |  | 1 | 0 | 1 | 1 |  |  |  |
|  |  |  | D8 |  | word bit 12 |  |  | 1 | 1 | 0 | 0 |  |  |  |
|  |  |  |  |  |  |  |  | V4 | V3 | V2 | V1 |  |  |  |
|  |  |  |  |  |  |  |  | 1 | 1 | 1 | 0 |  |  |  |
|  |  |  |  | P4 | P3 | P2 | P1 | 1 | 1 | 1 | 0 |  |  |  |
|  |  |  |  | V4 | V3 | V2 | V1 | 1 | 1 | 1 | 0 |  |  |  |
|  |  |  |  | C4 | C3 | C2 | C1 | 0 | 0 | 0 | 0 |  |  |  |

As shown, check bit CKB equals 1, designating single bit error. Correction word=0000=0, which is the erroneous bit $W_0/P_0$.

In an example, illustrated in Table 17, dual data bit error detection is illustrated.

TABLE 17

| original | W12 | W11 | W10 | W9 | W8 | W7 | W6 | W5 | W4 | W3 | W2 | W1 | W0 |
|---|---|---|---|---|---|---|---|---|---|---|---|---|---|
| data | D8 | D7 | D6 | D5 | P4 | D4 | D3 | D2 | P3 | D1 | P2 | P1 | P0 |
|  | 0 | 1 | 0 | 0 | 1 | 0 | 0 | 1 | 1 | 1 | 0 | 1 | 0 |

TABLE 17-continued

| received data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | CKB |
|---|---|---|---|---|---|---|---|---|---|---|---|---|---|---|
|  | 1 | 1 | 1 | 0 | 1 | 0 | 0 | 1 | 1 | 1 | 0 | 1 | 0 | 0 |
|  |  |  |  | D1 | word bit 3 |  |  | 0 | 0 | 1 | 1 |  |  |  |
|  |  |  |  | D2 | word bit 5 |  |  | 0 | 1 | 0 | 1 |  |  |  |
|  |  |  |  | D6 | word bit 10 |  |  | 1 | 0 | 1 | 0 |  |  |  |
|  |  |  |  | D7 | word bit 11 |  |  | 1 | 0 | 1 | 1 |  |  |  |
|  |  |  |  | D8 | word bit 12 |  |  | 1 | 1 | 0 | 0 |  |  |  |
|  |  |  |  |  |  |  |  | V4 | V3 | V2 | V1 |  |  |  |
|  |  |  |  |  |  |  |  | 1 | 0 | 1 | 1 |  |  |  |
|  |  |  |  |  | P4 | P3 | P2 | P1 | 1 | 1 | 0 | 0 |  |  |
|  |  |  |  |  | V4 | V3 | V2 | V1 | 1 | 0 | 1 | 1 |  |  |
|  |  |  |  |  | C4 | C3 | C2 | C1 | 0 | 1 | 1 | 0 |  |  |

As shown, check bit CKB equals 0, designating either no error, or a dual bit error. Correction word is 0110 (not equal to 0000), indicating a bit needs correction. Both these conditions taken together indicate a dual bit error.

In an example, illustrated in Table 18, dual ECC parity bit error detection is illustrated.

TABLE 18

| original data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | |
|---|---|---|---|---|---|---|---|---|---|---|---|---|---|---|
|  | 1 | 0 | 1 | 0 | 0 | 0 | 1 | 1 | 1 | 1 | 0 | 1 | 1 |  |
| received data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | CKB |
|  | 1 | 0 | 1 | 0 | 1 | 0 | 1 | 1 | 0 | 1 | 1 | 0 | 1 | 0 |
|  |  |  |  | D1 | word bit 3 |  |  | 0 | 0 | 1 | 1 |  |  |  |
|  |  |  |  | D2 | word bit 5 |  |  | 0 | 1 | 0 | 1 |  |  |  |
|  |  |  |  | D3 | word bit 6 |  |  | 0 | 1 | 1 | 0 |  |  |  |
|  |  |  |  | D6 | word bit 10 |  |  | 1 | 0 | 1 | 0 |  |  |  |
|  |  |  |  | D8 | word bit 12 |  |  | 1 | 1 | 0 | 0 |  |  |  |
|  |  |  |  |  |  |  |  | V4 | V3 | V2 | V1 |  |  |  |
|  |  |  |  |  |  |  |  | 0 | 1 | 1 | 0 |  |  |  |
|  |  |  |  |  | P4 | P3 | P2 | P1 | 1 | 0 | 1 | 0 |  |  |
|  |  |  |  |  | V4 | V3 | V2 | V1 | 0 | 1 | 1 | 0 |  |  |
|  |  |  |  |  | C4 | C3 | C2 | C1 | 1 | 1 | 0 | 0 |  |  |

As shown, check bit CKB equals 0, designating either no error, or a dual bit error. Correction word is 1100 (not equal to 0000), indicating a bit needs correction. Both these conditions taken together indicate a dual bit error, but there is no indication whether the errors are data bits or parity bits.

In an example, illustrated in Table 19, data bit error and ECC parity bit error with dual error detection is illustrated.

TABLE 19

| original data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | |
|---|---|---|---|---|---|---|---|---|---|---|---|---|---|---|
|  | 1 | 1 | 0 | 0 | 0 | 0 | 0 | 1 | 0 | 0 | 1 | 0 | 0 |  |
| received data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | CKB |
|  | 1 | 1 | 0 | 0 | 0 | 0 | 0 | 0 | 0 | 0 | 0 | 0 | 0 | 0 |
|  |  |  |  | D7 | word bit 11 |  |  | 1 | 0 | 1 | 1 |  |  |  |
|  |  |  |  | D8 | word bit 12 |  |  | 1 | 1 | 0 | 0 |  |  |  |
|  |  |  |  |  |  |  |  | V4 | V3 | V2 | V1 |  |  |  |
|  |  |  |  |  |  |  |  | 0 | 1 | 1 | 1 |  |  |  |
|  |  |  |  |  | P4 | P3 | P2 | P1 | 0 | 0 | 0 | 0 |  |  |
|  |  |  |  |  | V4 | V3 | V2 | V1 | 0 | 1 | 1 | 1 |  |  |
|  |  |  |  |  | C4 | C3 | C2 | C1 | 0 | 1 | 1 | 1 |  |  |

As shown, check bit CKB equals 0, designating either no error, or a dual bit error. Correction word is 0111 (not equal to 0000), indicating a bit needs correction. Both these conditions taken together indicate a dual bit error, but there is no indication whether the errors are data bits or parity bits.

In an example, illustrated in Table 20, data bit error and word parity bit $P_0$ error with dual error detection is illustrated.

TABLE 20

| original data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | |
|---|---|---|---|---|---|---|---|---|---|---|---|---|---|---|
| | 1 | 0 | 0 | 0 | 1 | 1 | 0 | 1 | 1 | 0 | 1 | 0 | 0 | |
| received data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | CKB |
| | 1 | 0 | 1 | 0 | 1 | 1 | 0 | 1 | 1 | 0 | 1 | 0 | 1 | 0 |
| | | | D2 | | word bit 5 | | | 0 | 1 | 0 | 1 | | | |
| | | | D4 | | word bit 7 | | | 0 | 1 | 1 | 1 | | | |
| | | | D6 | | word bit 10 | | | 1 | 0 | 1 | 0 | | | |
| | | | D8 | | word bit 12 | | | 1 | 1 | 0 | 0 | | | |
| | | | | | | | | V4 | V3 | V2 | V1 | | | |
| | | | | | | | | 0 | 0 | 0 | 0 | | | |
| | | | | | P4 | P3 | P2 | P1 | 1 | 1 | 1 | 0 | | |
| | | | | | V4 | V3 | V2 | V1 | 0 | 0 | 0 | 0 | | |
| | | | | | C4 | C3 | C2 | C1 | 1 | 1 | 1 | 0 | | |

As shown, check bit CKB equals 0, designating either no error, or a dual hit error. Correction word is 1110 (not equal to 0000), indicating a bit needs correction. Both these conditions taken together indicate a dual bit error, but there is no indication whether the errors are data bits or parity bits.

In an example, illustrated in Table 21, ECC parity bit error and word parity bit $P_0$ error—dual error detection.

TABLE 21

| original data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | |
|---|---|---|---|---|---|---|---|---|---|---|---|---|---|---|
| | 1 | 0 | 0 | 1 | 0 | 1 | 0 | 0 | 0 | 0 | 1 | 0 | 0 | |
| received data | W12 D8 | W11 D7 | W10 D6 | W9 D5 | W8 P4 | W7 D4 | W6 D3 | W5 D2 | W4 P3 | W3 D1 | W2 P2 | W1 P1 | W0 P0 | CKB |
| | 1 | 0 | 0 | 1 | 0 | 1 | 0 | 0 | 1 | 0 | 1 | 0 | 1 | 0 |
| | | | D4 | | word bit 7 | | | 0 | 1 | 1 | 1 | | | |
| | | | D5 | | word bit 9 | | | 1 | 0 | 0 | 1 | | | |
| | | | D8 | | word bit 12 | | | 1 | 1 | 0 | 0 | | | |
| | | | | | | | | V4 | V3 | V2 | V1 | | | |
| | | | | | | | | 0 | 0 | 1 | 0 | | | |
| | | | | | P4 | P3 | P2 | P1 | 0 | 1 | 1 | 0 | | |
| | | | | | V4 | V3 | V2 | V1 | 0 | 0 | 1 | 0 | | |
| | | | | | C4 | C3 | C2 | C1 | 0 | 1 | 0 | 0 | | |

As shown, check bit CKB equals 0, designating either no error, or a dual bit error. Correction word is 0100 (not equal to 0000), indicating a bit needs correction. Both these conditions taken together indicate a dual bit error, but there is no indication whether the errors are data bits or parity bits.

Table 22 summarizes how to interpret the check bit CKB and correction word to determine the validity of the received data.

TABLE 22

| CKB | Correction Word | Examples | Interpretation |
|---|---|---|---|
| 0 | 0000 | 0 | no error |
| 0 | 0001-1111 | 5, 6, 7, 8, 9 | dual errors detected, unknown locations |
| 1 | 0000 | 4 | single error detected in word parity bit W0/P0 |

TABLE 22-continued

| CKB | Correction Word | Examples | Interpretation |
|---|---|---|---|
| 1 | 0001-1100 | 2, 3 | single error detected, binary location specified |

ECC logic circuitry may be created to perform single bit detection and correction, with dual bit detection. Most of the circuitry can be built using dual input exclusive OR logic.

The main function performed by ECC is parity generation, either of the original data to generate and insert the ECC parity bits, or of the received data to generate the verify parity bits. As already shown in the above example, parity bits are generated based upon even parity patterns corresponding to the data bit locations inside the data/parity word. Referring back previous examples, for every data bit in the complete word which is a "1", the binary value of the locations of those bits are added together. The ECC parity bits are set so that each of the data bit summing columns is even parity.

TABLE 23

| word bits | W12 | W11 | W10 | W9 | W8 | W7 | W6 | W5 | W4 | W3 | W2 | W1 |
|---|---|---|---|---|---|---|---|---|---|---|---|---|
| data | D8 | D7 | D6 | D5 | P4 | D4 | D3 | D2 | P3 | D1 | P2 | P1 |
| | 1 | 1 | 1 | 1 | x | 1 | 1 | 1 | x | 1 | x | x |

As shown in the example of Table 23, all data bits as "1's". The parity generation table is shown in Table 24.

TABLE 24

|    |            | P4 | P3 | P2 | P1 |
|----|------------|----|----|----|----|
| D1 | word bit 3 | 0  | 0  | 1  | 1  |
| D2 | word bit 5 | 0  | 1  | 0  | 1  |
| D3 | word bit 6 | 0  | 1  | 1  | 0  |
| D4 | word bit 7 | 0  | 1  | 1  | 1  |
| D5 | word bit 9 | 1  | 0  | 0  | 1  |
| D6 | word bit 10| 1  | 0  | 1  | 0  |
| D7 | word bit 11| 1  | 0  | 1  | 1  |
| D8 | word bit 12| 1  | 1  | 0  | 0  |

To generate the parity for $P_1$, the total number of "1's" could be counted, of which there are five, and since five is an odd number, $P_1$ is set to "1". It does not matter what $D_3$, $D_6$, and $D_8$ are in the data word, because whether they are added to the table or not, their $P_1$ bits will always be "0". In this example, the only interest is in those bits that are "1". In so doing, the amount of logic circuitry may be reduced.

$D_1$, $D_2$, $D_4$, $D_5$ and $D_7$ are the only word data bits that need to be considered for generating the $P_1$ bit. However, if any of $D_1$, $D_2$, $D_4$, $D_5$ and $D_7$ are "0", they don't need to be considered. The simplest way to generate the value of $P_1$ from logic circuitry, may be simply to exclusive OR word data bits $D_1$, $D_2$, $D_4$, $D_5$ and $D_7$. Using dual input XOR gates, the operation is performed as illustrated in Table 25.

TABLE 25

$((D1 \otimes D2) \otimes (D4 \otimes D5)) \otimes D7 = P1$
$((D1 \otimes D3) \otimes (D4 \otimes D6)) \otimes D7 = P2$
$(D2 \otimes D3) \otimes (D4 \otimes D8) = P3$
$(D5 \otimes D6) \otimes (D7 \otimes D8) = P4$ Generation of the word parity bit $P_0$ is done by exclusive OR'ing all word bits $W_{12}$-$W_1$, as shown in Table 26.

TABLE 26

$((((D8 \otimes D7) \otimes (D6 \otimes D5)) \otimes ((P4 \otimes D4) \otimes (D3 \otimes D2))) \otimes ((P3 \otimes D1) \otimes (P2 \otimes P1))) = P0$ The correction word is created by exclusive OR'ing the parity bits with the verify parity bits, one bit at a time, and the check bit is exclusive OR created similarly to the $P_0$ parity hit. For a single bit error correction, the four bits of the correction word can be handled as an address decoding of the word bit that needs to be flipped from a "0" to a "1" or a "1" to a "0". Single bit error detection is signified by the check hit being a "1". For dual bit detection, the check bit is a "0". However, the check bit is also a "0" if there is no error at all. Therefore, one last piece of logic circuitry may be included which takes the four correction bits $C_4$-$C_1$, and OR's them together. If the OR'ing is a "0", and the check bit is "0", there are no errors. If the OR'ing is not "0", and the check bit is "0", it indicates a dual bit error.

In contrast with the foregoing example, line 32 incorporates a total thirty-two (32) data memory cells 34 organized into four eight-bit data bytes 12, 14, 16 18 and twenty (20) error correction memory cells 36 organized into four five-bit error correction codes 22, 24, 26, 28 for a total of fifty-two (52) memory cells 30. Data storage element 10 is conventionally wired so that all memory cells 30 of line 32 are electrically activated at the same time for the purposes of writing or reading the data stored in memory cells 30, regardless of which individual data bytes 12, 14, 16, 18 are to be read or written to.

The process of writing data to data storage element 10 is thus accomplished by obtaining data byte 12, determining error correction code block 22 for data byte 12, electrically activating line 32, writing data byte 12 and error correction code 22 to the appropriate data memory cells 34 and error correction memory cells 36 and electrically deactivating line 32. In so doing, data byte 12 is stored with a concurrent and valid error correction code block 22. Writing one data byte 12 and error correction code block 22 creates no impact on the validity of any other data byte 14, 16, 18 or error correction code block 24, 26, 28. However, incorporating twenty (20) error correction memory cells 36 into each line 32 of data storage element 10 represents a sixty-two and one-half percent (62.5%) increase in the number of memory cells 30 needed to store thirty-two (32) bits of data, and approximately a corresponding sixty-two and one-half percent (62.5%) increase in the amount of power needed to operate data storage element 10.

FIG. 3 is a block diagram of implantable medical device 40 incorporating data storage element 42, organized along different lines than data storage element 10. Data storage element 42 is coupled to processor 44. Alternatively, processor 44 is an integral component to data storage element 42. Data storage element 42 and processor 44 are coupled to internal power source 46. Implantable medical device 40 optionally includes various additional componentry depending on the particular function of implantable medical device 40. In various embodiments, implantable medical device 40 includes telemetry module 48, sensor 50 and therapy module 52. Additional components which are well known in the art as being incorporated in implantable medical devices may also be included.

In contrast to the memory data structure 10 illustrated in FIG. 1, FIG. 4 illustrates data storage element 42 having line 54 having the same data storage capacity as line 32 of data storage element 10, as well as error checking and correction capabilities equivalent to those of data storage element 10, but utilizes twenty-three percent (23%) less space and power consumption as data storage element 10. Data bits 34 of data bytes 12, 14, 16, 18 are arranged in line 54 according to the same format as in line 32, with data bit zero of each byte 12, 14, 16, 18 organized together, followed by data bit one of each byte 12, 14, 16, 18, and so forth. Error correction code 56, however, is only seven bits, being based on the calculation that $2^5$ data bits requires 5+1 error correction code bits for single error detection and correction plus one additional bit for dual error detection without correction, for a total of seven error correction code bits.

Unlike in data storage element 10, because error correction code 56 corresponds to all four data bytes 12, 14, 16, 18, but data bytes 12, 14, 16, 18 may be written individually, the writing of one data byte 12, 14, 16, 18 does not provide for processor 44 to calculate an error correction code at the time of writing one data byte 12, 14, 16, 18. Instead, all data stored in line 54 must be accounted for to determine the error correction code. Because the process of storing data in implantable medical devices often involves writing anywhere from hundreds to thousands of bytes serially, if not more, during a single session, the resources of data storage element 42 and processor 44 may need to be dedicated to writing the data and not to continually obtaining all of the data in each line 54 and calculating error correction code 56 for each line 54 every time a data byte is written to line 54.

Instead, validity or "scrub" bit 58 is included in each line 54. When data is written to line 54, validity bit 58 is set to indicate that error correction code 56 for line 54 is invalid. In an embodiment, the invalid error correction code is indicated by a logical "0". After the completion of a serial writing of data bytes to data storage element 42, processor 44 may assess validity bit 58 of each line 54. For each validity bit 58 which indicates that the corresponding error correction code 56 is invalid, processor 44 downloads data bits 32 and determines the seven-bit error correction code 56 for line 54. Error correction code 56 is then saved in line 54 and validity bit 58 is switched to indicate that error correction code 56 is valid. In an embodiment, the valid error correction code is indicated by a logical "1".

Thus, the inclusion of validity bit 58 provides for an ability to utilize a single error correction code 56 corresponding to all of the data in an entire line 54, where line 54 incorporates more memory cells 34 than the basic data word which is stored in line 54, i.e., an eight-bit byte. This concept is scalable to different sizes, both for the number of memory cells 34 in line 54 (and, by extension, the size of error correction code 56 in line 54) and the size of the word written to line 54. In an embodiment, a line comprises sixty-four (64) data bits, an eight-bit (8) error correction code, and one (1) validity bit, for a total line size of seventy-three (73) and error correction overhead accounting for only a fourteen (14) percent increase in the size and power consumption of the data storage element.

As is known in the art, in various embodiments of electronic data storage, corruption of already written data bits occur inherently and naturally. While the particular memory bit into which the data, bit has been written may be fully functional, and capable of being re-written, the data bit may switch to the opposite digital value, for instance from a logical "0" to a logical "1". It may be determined, both through theoretical modeling and through empirical testing, an expected frequency of data corruption within data storage element 42.

Based on the expected frequency of data corruption, data storage element 42 may be "scrubbed" by periodically setting some or all of validity bits 58 to indicate invalidity. In various embodiments, the scrubbing procedure is performed daily and weekly, though various other intervals are anticipated. When processor 44 checks a status of validity bit 58 and notes that validity bit 58 is invalid, processor 44 recalculates error correction code 56. If the newly calculated error correction code 56 matches the previous error correction code 56 then it is understood that data in corresponding line 54 is valid and validity bit 58 is set to valid. If the newly calculated error correction code 56 does not match the previous error correction code, it is understood that at least one bit in line 54 and error correction code 56 has become corrupted. On the basis of differences between the data in line 54 and the current and previous error correction codes 56, the corrupted bit may be rewritten to the correct value and validity bit 58 set to valid. In various embodiments, various suitable error correction algorithms well known in the are utilized. In an embodiment, the error correction algorithm illustrated above in detail is utilized.

In certain cases, bit corruption may occur due to the permanent or relatively long-term physical corruption of a bit in line 54 or error correction code 56. In such cases, analysis of error correction code 56 will indicate that corruption has occurred. However, because of the physical corruption of data storage element 42 itself, it may not be possible to continue to use the corrupted bit, which may render line 54 itself inoperable. In an embodiment, if a bit in physical line 54 becomes corrupted, physical line 54 may be copied to a new physical line 54, with the corrupted bit corrected in new physical line 54.

Error correction code 56 may be utilized. When data in corresponding line 54 is transmitted variably from and to data storage element 42. FIG. 5 illustrates the process by which data may be transmitted from and to data storage element while utilizing error correction code 56. In the case of data being received for storage in data storage element 42, error correction code generator 60 receives data and a corresponding transmission error correction code from DATAIN registers 62. In various embodiments error correction code generator is or is a component of processor 44. In an embodiment, the data is one of data segments 12, 14, 16, 18. In an embodiment, the data is an entire line 54 of data. Error correction code generator 60 calculates a new error correction code 56 for the data and compares the new error correction code 56 against the transmission error correction code 56. If the error correction codes 56 match the data and, in embodiments in which the data transmitted is equal to an entire line 54, error correction code 56 is written to data storage element 42. If the error correction codes 56 do not match the data the data is fixed according to the methodology described above. Master error correction code register 64 may be updated according to the written data.

In embodiments in which data is to be transmitted form data storage element 42 to an outside destination, data is read from data storage element 42 and sent to error correction code generator 60. In an embodiment, the data sent from data storage element 42 is one of data segments 12, 14, 16, 18. In an embodiment, the data sent from data storage element is an entire line 54 of data. Error correction code generator 60 generates an error correction code 56 for the transmitted data. In embodiments in which an entire line 54 of data is transmitted, the stored error correction code 56 for line 54 is also transmitted, and the new error correction code 56 is compared against the stored error correction code 56 to verify the validity of the data to be transmitted. If the data to be transmitted has been corrupted the data may be fixed according to the methodology described above. The data and the calculated error correction code 56 are sent to DATAOUT drivers 66 where they may be transmitted to a separate destination.

FIG. 6 is a flowchart for storing data in data storage element 42. A plurality of data bits are stored (600) in memory bits 34 of one of data segments 12, 14, 16, 18 of line 54. Error correction code 56 is generated (602) by processor 44 for all of data bits 34 in line 54 and stored. Then validity bit 58 is marked (604) as valid to indicate that error correction code 56 is valid.

In various embodiments, the generating (602) and marking (604) steps are periodically repeated. The frequency of repeating the generating (602) and marking (604) steps is selected based, at least in part, on a frequency by which it is expected that data bits 34 and error correction codes 56 may become corrupted. In an embodiment, the frequency is daily.

In an embodiment, before error correction code 56 is generated (602), validity bit 58 is marked (606) as invalid. In such embodiments, marking the validity bit invalid (606) is similarly repeated along with the generating (602) and marking valid (604) steps. In various such embodiments, validity bit is marked invalid (606) less than one (1) second before the generating (602) and marking valid (604) steps are performed. In alternative embodiments, the marking invalid (606) step occurs more than one (1) second before the generating (602) and marking valid (604) steps.

In an embodiment, after the marking valid (604) step, error correction code 56 is compared (608) with data bits 34 of line 54 to generate a comparison using processor 44. Processor 44 determines (610) if any of data bits 34 or error correction code 56 of line 54 are in error, i.e. corrupted, based, at least in part, on the comparison, and corrects (612) the a data bit 34 or error correction code 56 in error based, at least in part, on error correction code 56.

In an embodiment, DATAIN register 62 receives (614) data and a transmission error code 56. Error correction code generator 60 verifies (616) an accuracy of the data based on transmission error correction code 56 and, if the data or the transmission error correction code 56 are not correct, corrects (618) an incorrect bit then stores (600) the data bits.

In an embodiment, error correction code generator 60 generates (620) a transmission error correction code 56 based on data sent to error correction code generator 60 from data storage element 42. Then, DATAOUT drivers 66 transmit (622) the data and the transmission error correction code to a receiver.

In a further embodiment, prior to storing (600) data bits to line 54, existing error correction code 56 of line 54 is optionally compared (624) with existing data segments 12, 14, 16, 18 of line 54. In such an optional embodiment, a determination (626) is made as to whether the existing data segments 12, 14, 16, 18 are corrupted. In so doing, prior to writing new data bits, a determination may be made as to the status of the bits which remain after the storing (600) data bits step occurs. Barring checking for corruption before storing (600), and further optionally correcting (628) the corrupted bits, data in line 54 may be corrupt but deemed to be valid if additional data is stored (600) to the line and a new error correction code generated (602).

Thus, embodiments of the memory with selectively writable error correction codes and validity bits and method are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of storing data in and reading data from a memory having a data storage element having a plurality of lines, each of said plurality of lines having a plurality of segments, each of said plurality of segments having a plurality of data bits, a plurality of error correction codes each associated with said plurality of segments associated with each one of said plurality of lines, and a plurality of validity bits each associated with one of said plurality of lines, comprising the steps of:

storing a plurality of data bits into one of said plurality of segments of one of said plurality of lines without modifying any of said plurality of data bits associated with other of said plurality of segments associated with said one of said plurality of lines and without generating said plurality of error correction codes associated with said one of said plurality of lines;

marking, as a result of said storing step, one of said plurality validity bits associated with said one of said plurality of lines to indicate that said one of said plurality of error correction codes associated with said one of said plurality of lines as being invalid; then periodically and subsequent to said storing step, generating one of said plurality of error correction codes for all of said plurality of data bits in said plurality of segments associated with said one of said plurality of lines; and then marking one of said plurality validity bits associated with said one of said plurality of lines to indicate that said one of said plurality of error correction codes associated with said one of said plurality of lines as being valid;

reading a plurality of data associated with one of said plurality of segments wherein all of said plurality of data bits associated with said plurality of lines is activated during said reading step.

2. The method of claim 1 wherein an interval that is periodically repeating said generating step and said marking step is selected based, at least in part, on a likelihood of individual ones of said data bits to be corrupt.

3. The method of claim 1 further comprising the steps, prior to said storing step, of:

comparing one of said plurality of error correction codes associated with one of said plurality of lines with said plurality of data bits stored in said one of said plurality of lines to generate a comparison;

determining if any of said data bits stored in said one of said plurality of lines is in error based, at least in part, on said comparison.

4. The method of claim 1 further comprising the steps, after said step of marking to indicate that said one of said plurality of error correction codes associated with said one of said plurality of lines as being invalid, of:

comparing one of said plurality of error correction codes associated with one of said plurality of lines with said plurality of data bits stored in said one of said plurality of lines to generate a comparison;

determining if any of said data bits stored in said one of said plurality of lines is in error based, at least in part, on said comparison; and correcting said any of said plurality of data bits stored in said one of said plurality of lines based, at least in part, on said one of said plurality of error correction codes.

5. The method of claim 4 wherein a corruption of an individual one of said data bits does not prevent said individual one of said data bits from storing new data.

6. The method of claim 4 wherein said correcting step occurs based, at least in part, on said comparison being indicative of said one of said plurality of data bits being corrupted.

7. The method of claim 1 further comprising the steps, before said storing step, of:

receiving said plurality of data bits and a transmission error correction code;

verifying an accuracy of said plurality of data bits based on said transmission error correction code; and if said accuracy is indicative of an error in one of said plurality of data bits, correcting said one of said plurality of data bits.

8. The method of claim 1 wherein said memory is further associated with a transmitter and further comprising the step, after said generating step, of transmitting said plurality of data bits and said error correction code to a receiver separate from said memory.

9. The method of claim 1 further comprising a processor, and wherein said memory and said processor are further associated with a transmitter and further comprising the steps, after said storing step, of:

generating a transmission error correction code based, at least in part, on said plurality of data bits using said processor; and then transmitting said plurality of data bits and said transmission error code to a receiver separate from said memory.

* * * * *